(12) United States Patent
Young (10) Patent No.: US 8,702,335 B2
(45) Date of Patent: Apr. 22, 2014

(54) MODULE CLAMP AND FASTENER APPARATUS

(75) Inventor: Thomas Young, Albuquerque, NM (US)

(73) Assignee: Preformed Line Products Company, Mayfield Village, OH (US)

( * ) Notice: Subject to any disclaimer, the term of this patent is extended or adjusted under 35 U.S.C. 154(b) by 601 days.

(21) Appl. No.: 12/792,928

(22) Filed: Jun. 3, 2010

(65) Prior Publication Data

US 2011/0299957 A1    Dec. 8, 2011

(51) Int. Cl.
*F16B 21/02* (2006.01)

(52) U.S. Cl.
USPC .............. 403/22; 403/252; 403/255; 403/348

(58) Field of Classification Search
USPC .............. 403/21, 22, 252, 255, 264, 348, 350
See application file for complete search history.

(56) References Cited

U.S. PATENT DOCUMENTS

| | | | | |
|---|---|---|---|---|
| 794,986 | A * | 7/1905 | Kendig | 172/508 |
| 1,669,187 | A * | 5/1928 | Campbell | 403/21 |
| 1,820,667 | A * | 8/1931 | Leyes | 411/998 |
| 2,333,986 | A * | 11/1943 | Crayton | 403/331 |
| 2,672,848 | A * | 3/1954 | Brill | 403/21 |
| 2,737,268 | A * | 3/1956 | Smith | 403/21 |
| 2,839,165 | A * | 6/1958 | De Gasso | 403/22 |
| 2,893,097 | A * | 7/1959 | Hill et al. | 24/279 |
| 2,957,342 | A * | 10/1960 | Hanneman | 73/862.041 |
| 3,378,288 | A * | 4/1968 | Kanas | 411/116 |
| 3,488,792 | A * | 1/1970 | Bartz et al. | 16/86.1 |
| 3,589,525 | A * | 6/1971 | Allen | 403/348 |
| 3,908,330 | A * | 9/1975 | Frach et al. | 403/348 |
| 4,143,984 | A * | 3/1979 | Danescu | 411/401 |
| 4,285,379 | A * | 8/1981 | Kowalski | 411/85 |
| 4,316,675 | A * | 2/1982 | Melicque | 403/22 |
| 4,367,905 | A * | 1/1983 | Nauta | 384/477 |
| 4,460,299 | A * | 7/1984 | Kowalski | 411/85 |
| 4,481,748 | A * | 11/1984 | D'Alessio et al. | 52/638 |
| 4,750,310 | A * | 6/1988 | Holcombe | 411/84 |
| 5,716,154 | A * | 2/1998 | Miller et al. | 403/22 |
| 6,422,795 | B2 * | 7/2002 | Holt et al. | 410/115 |
| 7,175,377 | B2 * | 2/2007 | Womack et al. | 410/104 |
| 7,441,311 | B2 * | 10/2008 | Lovgren et al. | 24/279 |
| 7,497,651 | B2 * | 3/2009 | Harberts et al. | 410/101 |

(Continued)

FOREIGN PATENT DOCUMENTS

CA    2477180 A1    2/2006
JP    2010112033 A    5/2010

OTHER PUBLICATIONS

Blaine R. Copenheaver, Notification of Transmittal of the International Search Report and the Written Opinion of the International Searching Authority, or the Declaration, Sep. 22, 2011, 8 pages, International Searching Authority.

*Primary Examiner* — Victor MacArthur
(74) *Attorney, Agent, or Firm* — Kegler Brown Hill & Ritter; James J. Pingor (57) ABSTRACT

An apparatus and method of employing modified twist-to-engage bolts that attach a photovoltaic (PV) module to an extrusion rail or channel within a rail are disclosed. In addition to a modified twist-to-engage bolt (e.g., "t-bolt"), a complementary bracket portion having alignment tabs locks in place and clamps the modules to the rail. The anti-rotation locking system prevents twist-to-engage bolts from disengaging without the removal of the complementary bracket.

18 Claims, 8 Drawing Sheets

(56) References Cited

U.S. PATENT DOCUMENTS

| | | | |
|---|---|---|---|
| 2002/0009346 A1* | 1/2002 | Holt et al. | 410/94 |
| 2002/0172572 A1* | 11/2002 | Holt et al. | 410/115 |
| 2003/0015636 A1* | 1/2003 | Liebendorfer | 248/237 |
| 2005/0188634 A1* | 9/2005 | Bolton et al. | 52/235 |
| 2007/0209166 A1* | 9/2007 | Lovgren et al. | 24/279 |
| 2009/0230265 A1* | 9/2009 | Newman et al. | 248/229.11 |
| 2009/0232616 A1* | 9/2009 | Sekreta et al. | 411/107 |
| 2010/0065108 A1 | 3/2010 | West et al. | |

* cited by examiner

MODULE CLAMP AND FASTENER APPARATUS

BACKGROUND

A photovoltaic (PV) module is a flat, often rectangular panel that forms an assembly of photovoltaic (or solar) cells. The PV module is most commonly referred to as a solar module. Because the power that one module can produce is usually insufficient to meet requirements of a home or a business, many installations employ photovoltaic arrays. A photovoltaic array is constructed using a number of photovoltaic modules arranged in a grid of rows and columns. These modules are often installed using a traditional rail and top-down mid-clamp mounting system. Once installed, the system converts sunlight into electricity for a variety of applications, such as commercial and residential power.

During the planning and installation process, one of the fundamental considerations of a solar electric system is how and where to mount the array. Because sunlight is used for conversion to electricity, an important consideration is to select a location that has an optimal view of the sun's path in the sky for all seasons. For this reason, many of the installations are placed on rooftops using rail and clamp systems.

Many of the traditional top-down mid-clamps employ a "t-bolt" that is designed to fit into a channel of a rail. In operation, a "t-bolt" is usually inserted into the rail channel and slid to a position where a mid-clamp is used to secure a module. Unfortunately, oftentimes the "t-bolts" rotate 90° such that they separate from the rail via the channel. In other words, conventional "t-bolts" often rotate such that the head of the "t" is no longer perpendicular to the rail channel. Rather, the centerline of the head portion becomes parallel to the channel thereby allowing the head to exit the channel. Thus, the module would become loose and no longer affixed to the rail system.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a modified method of attaching a photovoltaic (PV) module to an extruded rail or channel within a rail. The fastening system employs a twist-to-engage bolt (e.g., "t-bolt") which allows placement at most any location along the extrusion channel. The shank or shaft of the fastener is configured in a unique, non-cylindrical shape. A complementary bracket portion having an aperture of the same unique, non-cylindrical shape, locks in place and clamps the module to the rail. The mating unique shapes ensure adequate locking of the "t" in the channel. The anti-rotation locking system prevents twist-to-engage bolts from disengaging without the removal of the associated or complementary bracket.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

Figure 1:
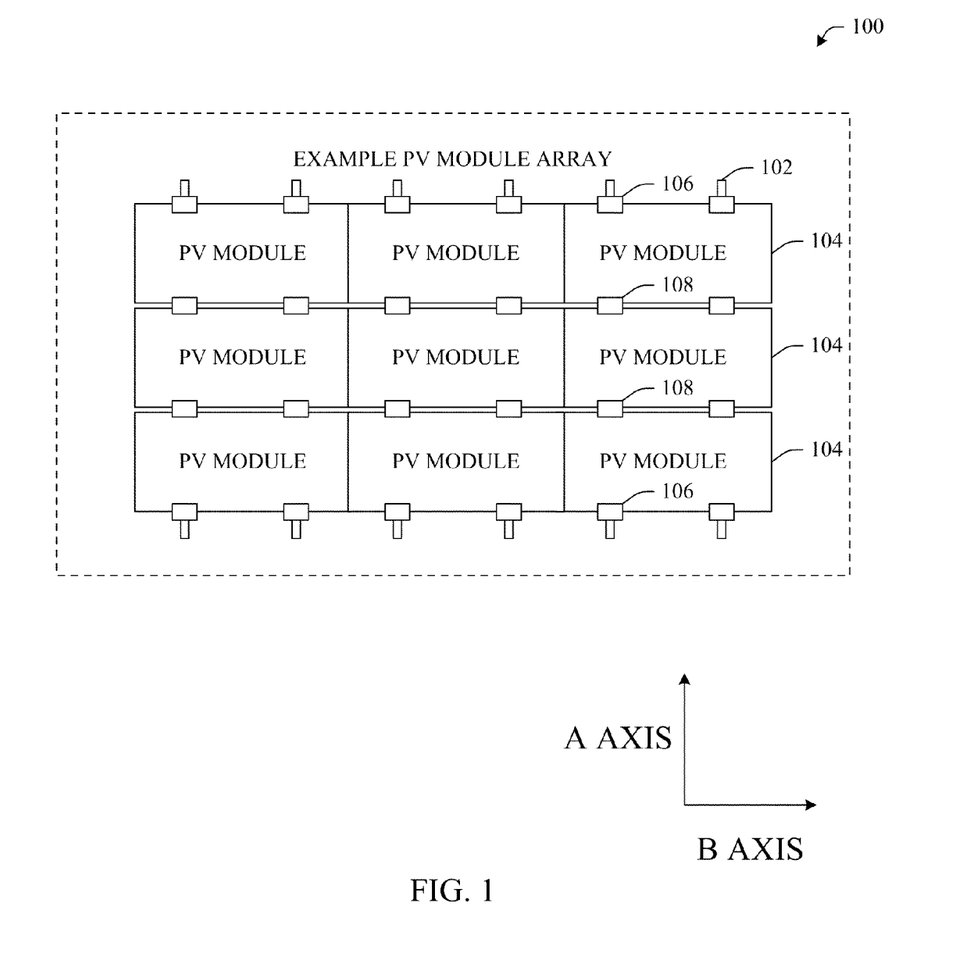
FIG. 1 illustrates an example photovoltaic (PV) module array in accordance with aspects of the innovation.

Referring initially to the drawings, FIG. 1 illustrates an example photovoltaic (PV) module array 100 in accordance with aspects of the innovation. For many years, companies have made large racking systems for PV modules. Construction of these conventional racking systems, and specifically placement of modules thereon, requires multiple installers, hardware and hand tools. Unfortunately, conventional mid-clamp mounting systems often become compromised due to inadequate "t-bolt" mounting. For instance, standard "t-bolt" installations often become unattached due to inadvertent rotation of the "t" within a channel. The innovation disclosed herein describes alternative systems and methods that can facilitate enhancing the installation process of photovoltaic module arrays by providing a unique anti-rotation clamping system. The anti-rotation clamping system employs a modified "twist-to-fasten" or "twist-to-engage" bolt together with a complementary and compatible clamping portion.

As illustrated in FIG. 1, traditional systems employ a series of tracks or rails 102 by which modules 104 can be aligned into rows and columns, ultimately forming an array. In the example of FIG. 1, the rails 102 are arranged with their channels parallel to the "a-axis" as indicated. The modules 104 are held into place using top-down clamping system end-clamps 106 or mid-clamps 108 that are secured by specially designed hardware pieces (e.g., slot-head bolts) that are manually slid into a rail groove. In most installations, each slotted-head bolt is individually slid into a groove starting at the end of a track segment such that the head of the bolt is orientated in parallel with the "b-axis" (or perpendicular to the a-axis). This head arrangement locks the head of the bolt into the channel(s) of the rail(s) 102.

A traditional end clamp 106 or mid-clamp 108 is placed onto the bolt thereby securing the module(s) using a top-down clamping arrangement. Unfortunately, traditional top-down clamping systems that employ slot-head or "t-" bolts do not provide a mechanism by which to ensure that the head or "t" of the bolt remains perpendicular to the channel thereby ensuring secure connection. Rather, oftentimes the head of the t-bolts rotates (e.g., 90 degrees) thereby enabling separation from the rail and compromise of the attachment of the PV modules. The innovation addresses this inadvertent rotation issue.

FIG. 1 illustrates an example PV module array 100 in accordance with aspects of the innovation. While a specific number of rows and columns, as well as rail orientation, are shown in the example, it is to be understood that the features, functions and benefits of the innovation can be employed with most any size and configuration of an array without departing from the spirit and/or scope of the innovation and claims appended hereto.

The array 100 is constructed using individual rails 102 and PV modules 104. It will be understood that, 1 to M rails and 1 to N modules can be employed to establish array 100 in aspects, where M and N are integers. Essentially, as shown, the rails 102 form tracks by which the PV modules 104 can traverse and ultimately be positioned. It is to be understood that the example PV module array 100 of FIG. 1 is provided to add perspective to the innovation and is not intended to limit the scope of the innovation in any manner.

While a specific rail type and structure configuration is shown in the examples described herein, it is to be understood that the clamp and/or fastener apparatus described in this specification can be employed with alternative rail and attachment systems without departing from the spirit and/or scope of the innovation and claims appended hereto. Additionally, the concepts described herein can be employed in implementations within or outside the solar panel industry. While specific embodiments of the innovation are shown to be utilized within the solar panel industry, it is to be understood that alternative embodiments have been contemplated outside or apart from the solar power field and are to be considered within the scope of this specification and claims appended hereto.

Figure 2:
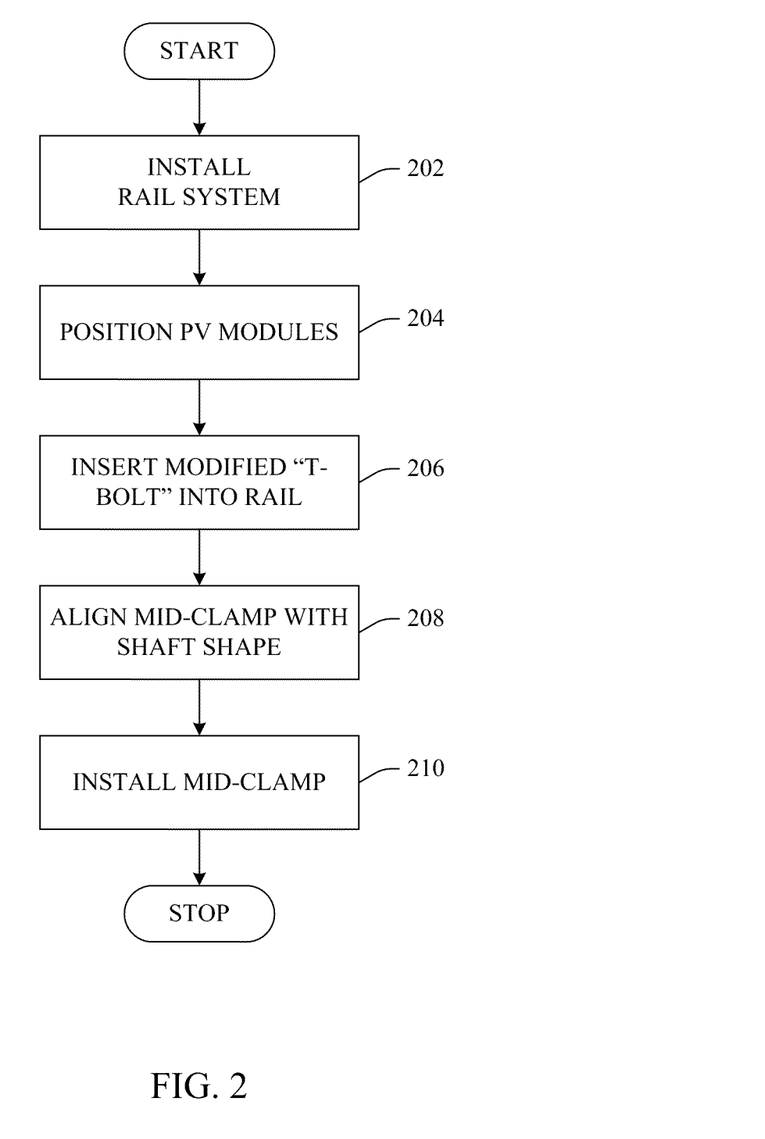
FIG. 2 illustrates an example flow chart of procedures that facilitate PV module attachment using an anti-rotation clamping system in accordance with an aspect of the innovation.

FIG. 2 illustrates a methodology of employing an anti-rotation clamping system in accordance with an aspect of the innovation. While, for purposes of simplicity of explanation, the methodology shown herein, e.g., in the form of a flow chart, is shown and described as a series of acts, it is to be understood and appreciated that the subject innovation is not limited by the order of acts, as some acts may, in accordance with the innovation, occur in a different order and/or concurrently with other acts from that shown and described herein. Moreover, not all illustrated acts may be required to implement a methodology in accordance with the innovation.

At 202, a rail system or structure is installed, for example, upon a rooftop. Here, a series of rails (e.g., 102 of FIG. 1) can be installed such that PV modules can be aligned thereon to form an array. As described supra, in one example, each of the rails is an aluminum extruded rail having a channel along the top of the rail that traverses the length of the rail portion. In other words, the channel is parallel to the length of each rail segment.

At 204, PV modules are positioned atop the rail structure. For instance, each PV module can be positioned on top of two rails. Here, PV modules are positioned having a gap therebetween such that a clamping bolt will fit between the modules. A clamping bolt fastener (e.g., modified t-bolt or twist-to-fasten bolt) is inserted between the PV modules.

As will be understood upon a review of the figures that follow, the clamping fastener can be manufactured or equipped with a unique shaft or shank shape (e.g., non-cylindrical) that mates to an aperture in a clamping portion. The unique shape ensures alignment of the clamping portion while maintaining secure connection within a rail channel (e.g., "t-bolt" head perpendicular to the channel length). While the fastener is referred herein as a "t-bolt" or modified "t-bolt," it is to be understood that the fastener in accordance with the innovation is an improved and modified version of conventional hardware such that alignment and attachment can be ensured.

A modified "t-bolt" or clamp fastener can be inserted into a channel of a rail at 206. Here, the head or "t" portion of the fastener can be inserted between the two modules and twisted or rotated to lock into the channel of the rail. In other aspects, the fasteners can be slidably inserted into the rail channel from the end of the channel and positioned as needed to sufficiently align with mid-clamps or clamping portions.

At 208, a clamping portion or mid-clamp can be aligned atop the fastener. For example, as illustrated in the figures that follow, the mid-clamp portion can be equipped with an aperture that is substantially larger and of substantially the same shape as the shank or shaft of the fastener. Once the mid-clamp is installed at 210, the matching non-round or non-cylindrical shapes of the aperture and shank ensure proper alignment of the clamping portion. Additionally, the unique shapes ensure proper alignment of the "t" head of the fastener within the channel of the rail.

Figure 3A:
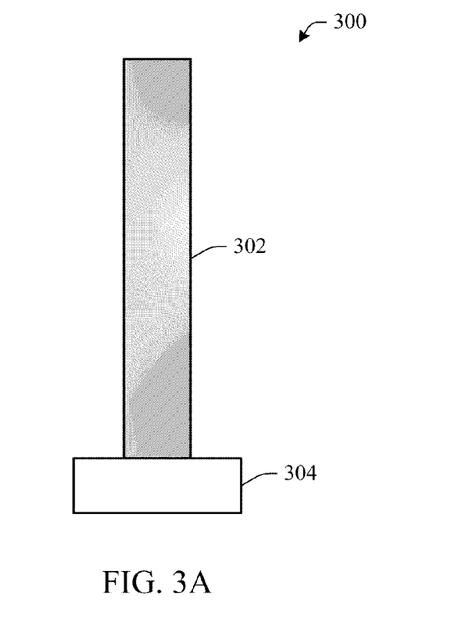
FIGS. 3A and 3B illustrate an example twist-to-engage bolt in accordance with aspects of the innovation.
Figure 3B:
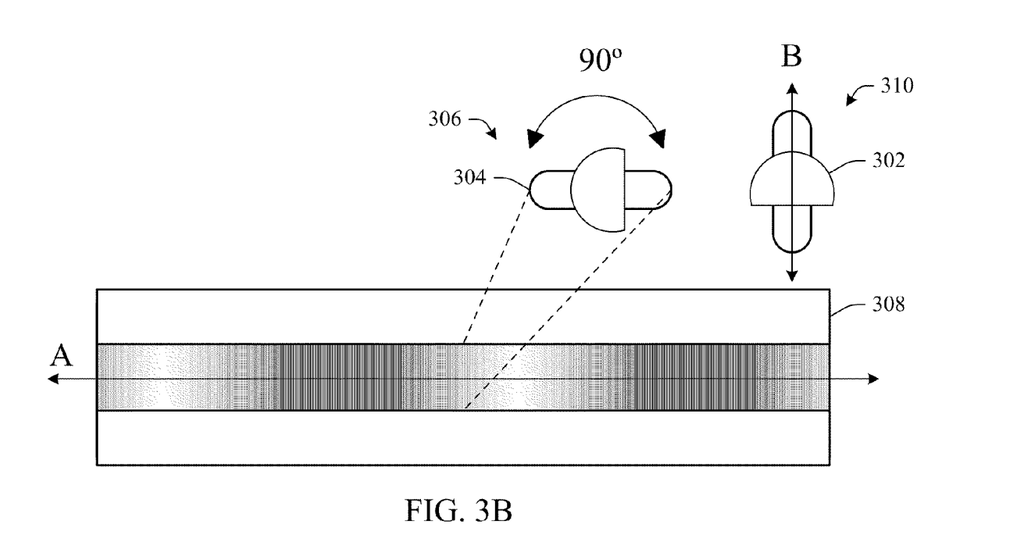

FIGS. 3A and 3B illustrate and provide perspective of a uniquely shaped shank or shaft of a clamp fastener 300 in accordance with aspects of the innovation. While specific proportions are shown, it is to be understood that alternative aspects exist that employ different proportions, e.g., shorter shank, smaller t-head. These alternative aspects are to be included within the scope of this disclosure and claims appended hereto. Additionally, while a threaded bolt fastener is described, it is to be understood that other types of uniquely shaped fasteners are to be included within this specification. For example, spring clip or other friction-based fasteners are to be included in lieu of a threaded bolt/nut connection described herein.

As illustrated in FIG. 3A, example fastener or modified t-bolt 300 includes a threaded shank 302 and a twist-to-lock or auto-lock t-shaped head 304. In operation, the head portion 304 enables the fastener to lock or secure into a channel, for example, a channel of an extruded rail or PV module support structure. FIG. 3B illustrates an example operation of the auto-locking bolt 300.

As shown in FIG. 3B, the top-down perspective view 306 of the bolt 300 illustrates the unique shaped shaft or shank 302. In this example, the shank 302 is shaped as a half moon. Additionally, the head portion (304 of FIG. 3A) is formed with four rounded corners that facilitate auto-locking by turning in either a clockwise or counter-clockwise direction as indicted. Once the head is placed in the rail 308 with the centerline of the head traversing the a-axis, the fastener can be easily locked into position by rotating in either direction 90°, or substantially 90°. As shown at 310, once rotated, the head portion 304 is orientated with its centerline traversing the b-axis, which is perpendicular to the channel or a-axis. This configuration locks the head portion 304 into the channel of the rail 308.

Additionally, as shown in the example of FIG. 3B, once rotated, the half moon shape of the shank also rotates such that the flat portion is parallel to the a-axis. This orientation ensures proper placement of the clamping portion as illustrated in the figures that follow. In other words, because the shank 302 is uniquely shaped, the clamping portion will only fit onto the shank 302 in one orientation. This unique functionality will be better understood upon a review of the figures that follow.

Figure 4:
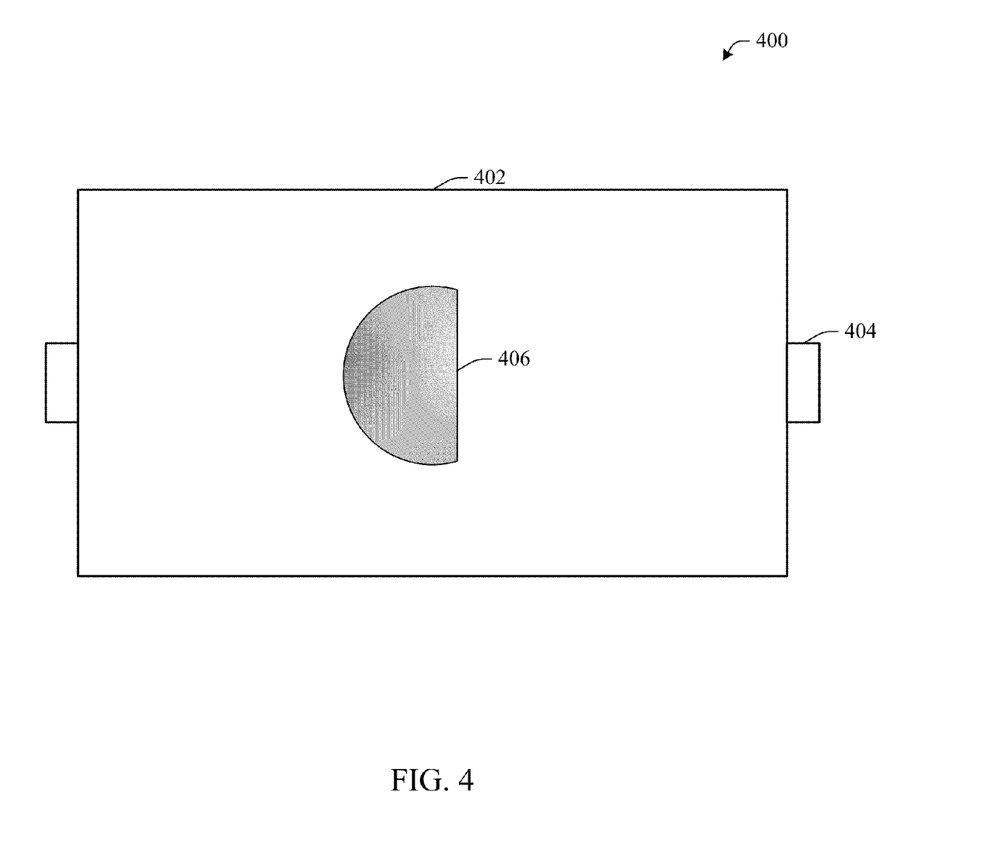
FIG. 4 illustrates a top perspective view of a complementary clamping portion in accordance with an aspect of the innovation.

FIG. 4 illustrates an example clamping portion 400 in accordance with an aspect of the innovation. The clamping portion 400 can be constructed of most any suitably rigid material such as steel, aluminum, alloy, plastics or the like. Additionally, the clamping portion 400 includes a body portion 402 and tabs or ears 404. While two tabs 404 are shown, other aspects can include more or fewer tabs 404 as designed or desired. The tabs 404 fit between the PV modules to assist in proper alignment. As described above, the body portion 402 includes an aperture 406 that is shaped to match the shank 302 of the fastener 300. It will be appreciated that the aperture 406 is sized slightly larger than the shank 302 such that the shank 302 is able to pass through the aperture or hole upon installation. Further, while a mid-clamp is illustrated and described, it is to be understood that features, functions and benefits of the innovation can be employed with end-clamps without departing from the spirit and scope of this specification.

Figure 5:
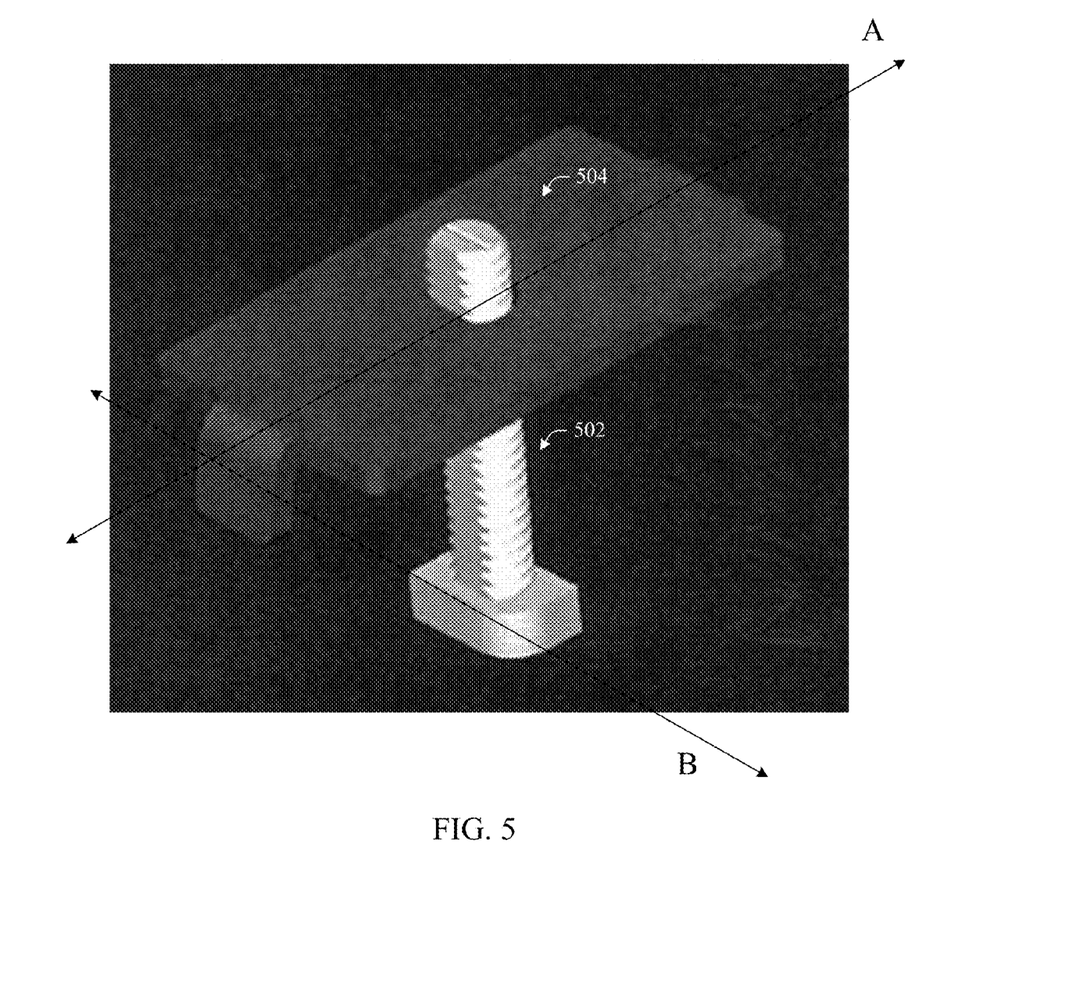
FIG. 5 illustrates an example twist-to-engage bolt and associated clamping portion in accordance with aspects of the innovation.

FIG. 5 illustrates an example fastener 502 in communication with an example clamp portion 504. In the example of FIG. 5, it is to be appreciated that the head of the fastener or t-bolt is equipped with one rounded corner such that the twist-to-lock is limited to rotation in the direction of the rounded corner. Additionally, consistent with the illustration of FIG. 1, the a-axis and b-axis are illustrated for reference. It is to be understood that these references are provided merely to provide perspective or context to the innovation and not to limit the features, functions and/or benefits in any manner.

Figure 6A:
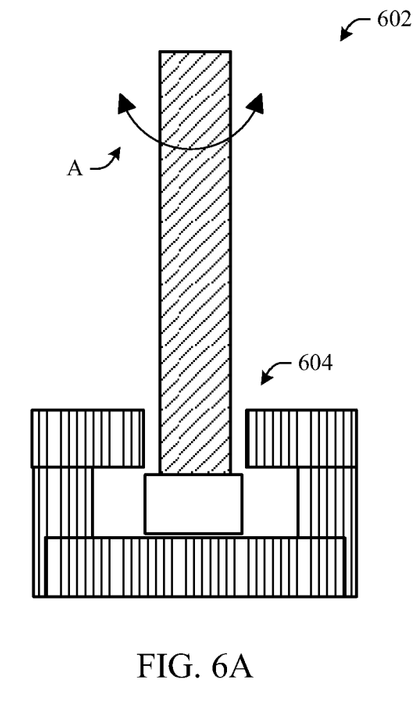
FIGS. 6A and 6B illustrate example side cross-sectional views of a twist-to-engage bolt in a channel in accordance with the innovation.
Figure 6B:
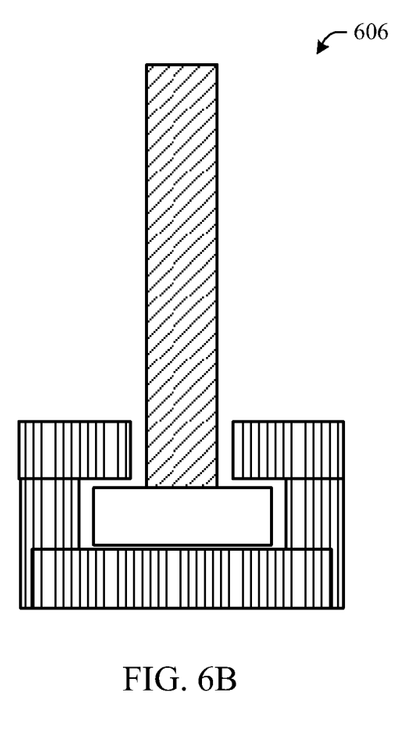

FIGS. 6A and 6B provide perspective of the twist-to-fasten or auto-lock fasteners in accordance with aspects of the innovation. As described above, a modified t-bolt 602 can be inserted into a track or channel 604 of a rail, e.g., an extruded rail. Once inserted, the head can be rotated as indicated by the arrow "A" of FIG. 6A. FIG. 6B illustrates a locked head within a rail. As shown at 606, the rotated bolt head (or t-head) prohibits the bolt from being removed from the rail. Thus, the head is locked into the rail once rotated.

One problem with conventional t-bolt arrangements is that the head rotates, e.g., back to its original position as shown in FIG. 6A and therefore compromises attachment to the rail. In accordance with the subject innovation, because the shank or shaft of the fastener or bolt is uniquely shaped to match a clamp portion, once it is rotated and locked into position, the clamp is slidably fit over the shaft. The tabs or ears of the clamp portion ensure proper alignment of the head within the rail. In other words, the clamp will only fit atop the shaft with the ears between adjacent PV modules when the head is fully locked. This anti-rotation concept will be better understood upon a review of FIG. 7 that follows.

Figure 7:
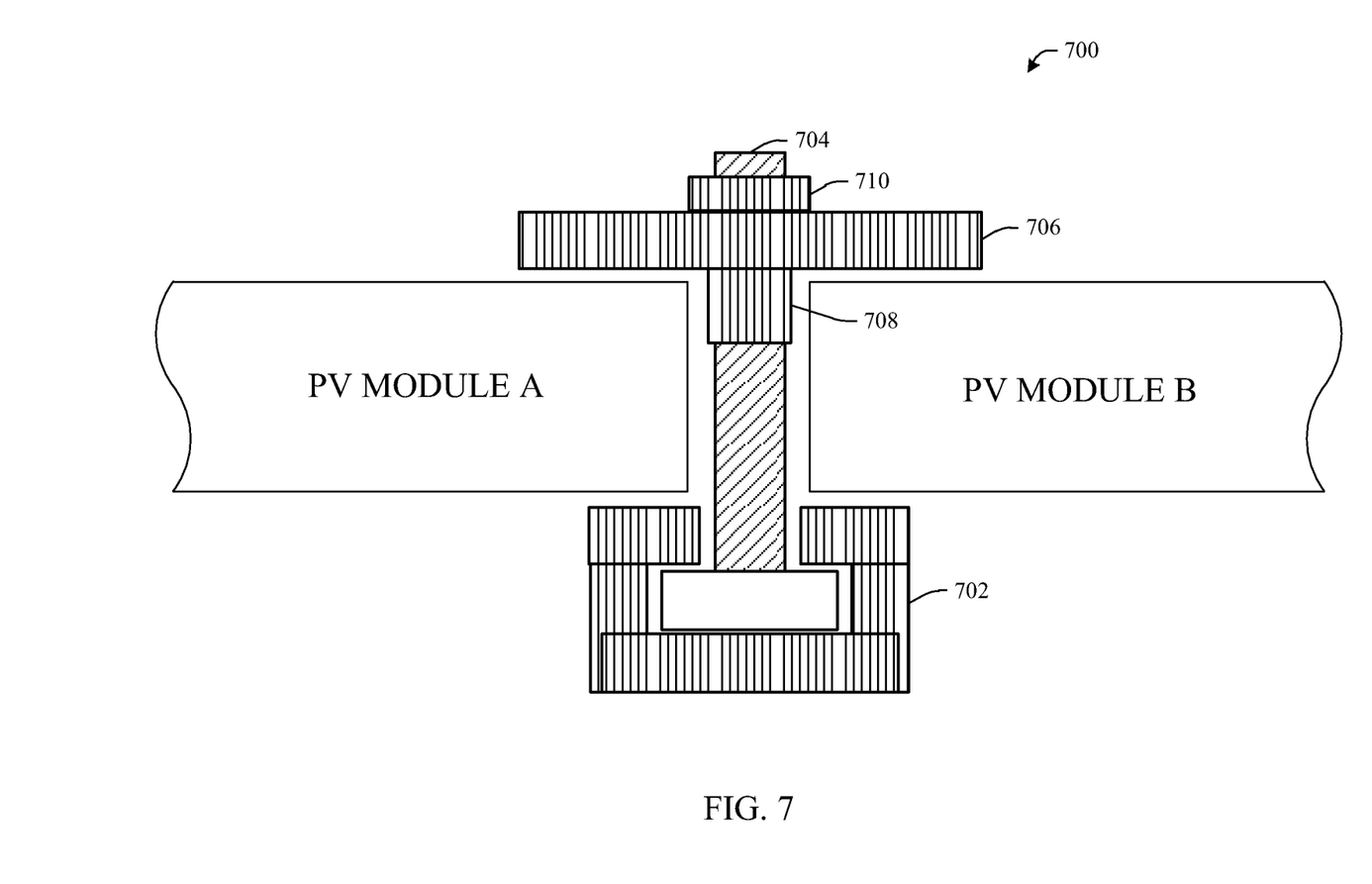
FIG. 7 illustrates an example anti-rotation clamping system in accordance with an aspect of the innovation.

Referring now to FIG. 7, an example embodiment 700 is shown in accordance with an aspect of the innovation. As illustrated, two PV modules, module A and module B, can be positioned adjacent to each other upon a rail (or set of rails) 702. As shown, the rail 702 can be equipped with a channel capable of housing a t-head of a modified twist-to-lock fastener 704. As discussed supra, the fastener 704 can be manufactured or configured with a uniquely shaped, non-cylindrical, shaft or shank, e.g., half moon shaped. Once the head of the fastener is placed into the channel and twisted into position, the shape of the shaft is orientated in a particular manner.

A clamping portion 706 having an aperture, hole or opening the same shape of the shaft, only slightly larger, is slid atop the shaft as shown. The clamping portion 706 is configured such that, when the shapes match between the hole and the shaft, the tabs 708 fit between the PV modules. These tabs 708, together with the unique shape of the shaft and aperture, ensure proper alignment of the head of the fastener 704 within the channel. In other words, the head of the fastener is configured to be in a fully locked position when the clamping portion 706 is aligned having the tabs 708 fit between the modules.

It will be appreciated that this unique manner of alignment of the head within the rail 702 can be extremely useful in ensuring proper attachment to a rail using a twist-to-lock type fastener (e.g., 704). A nut 710 can be threaded onto the shaft thereby securing the clamp portion 706 to the rail 702. While specific embodiments of using the unique clamping system has been described to secure PV modules, it is to be appreciated that this system can be used to secure most any component where a t-bolt or twist-to-fasten arrangement is used.

Figure 8A:
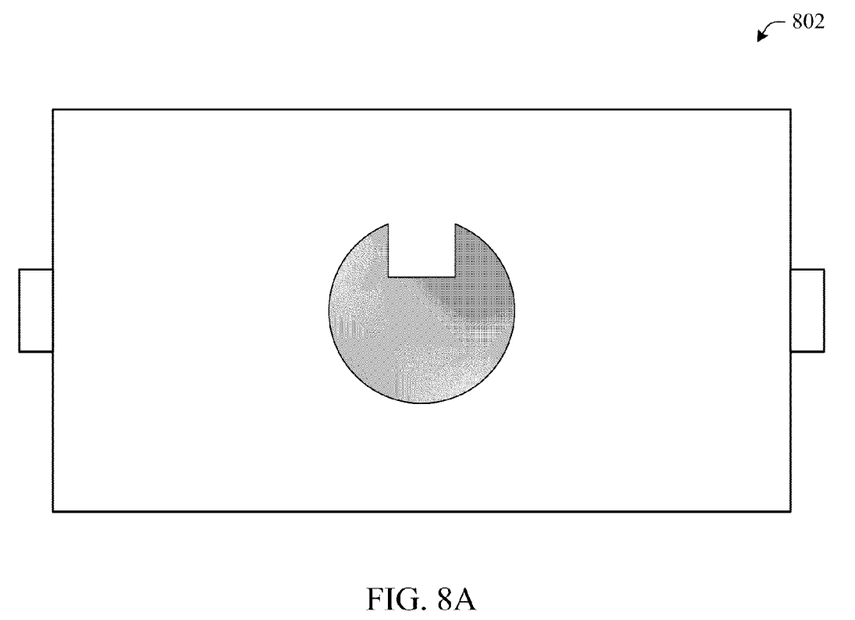
FIGS. 8A and 8B illustrate example top perspective views of alternative complementary clamping portions in accordance with aspects of the innovation.
Figure 8B:
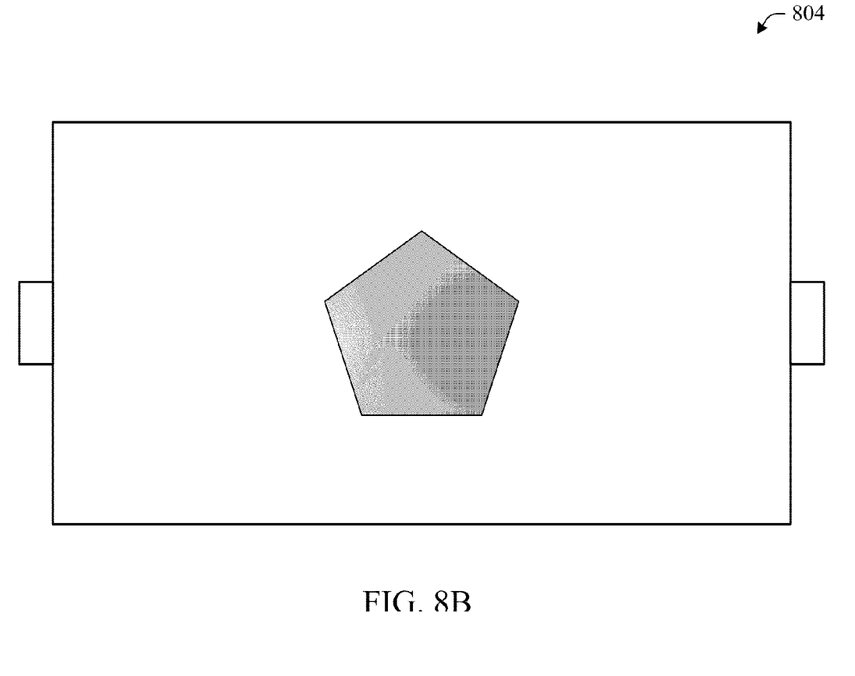

FIGS. 8A and 8B illustrate alternative aspects of the innovation. While a half moon shaped shank and aperture are shown and described in detail, it is to be understood that most any unique shape that provides a single mating configuration can be employed without departing from the spirit and scope of this specification. For example, FIG. 8A illustrates a clamping portion 802 having a keyway shape that can facilitate and ensure alignment of a twist-to-fasten bolt in accordance with other aspects. Similarly, FIG. 8B illustrates a pentagon shaped aperture in a clamping portion 804 that can ensure proper alignment of a t-head within a rail. These and other shapes are to be included within the scope of this disclosure and claims appended hereto.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A photovoltaic (PV) module clamping system, comprising:
   at least two photovoltaic modules;
   a t-bolt having a non-cylindrical shaped shank and a head having at least one rounded corner, wherein when the t-bolt is inserted into a rail channel, the t-bolt can rotate in only a direction of the rounded corner to properly position the t-bolt into the rail channel; and
   a clamp apparatus having an aperture consistent with the shape of the shank and a pair of tabs,
   wherein the shape and the pair of tabs facilitate alignment of the t-bolt within a slot of a rail.

2. The system of claim 1, wherein the t-bolt is a steel bolt.

3. The system of claim 1, wherein the t-bolt is an alloy bolt.

4. The system of claim 1, the t-bolt comprises a head having more than one rounded corner, wherein the t-bolt locks into the channel by rotating in either direction.

5. The system of claim 1, the shape of the shank has a cross-section of a half semi-circle.

6. The system of claim 1, the shape of the shank has a cross-section of a keyway.

7. The system of claim 1, the shape has a cross-section of a pentagon.

8. The system of claim 1, wherein the clamp is a mid-clamp that secures two disparate PV modules to the rail in a rail system.

9. A method of self-aligning the PV module clamping system of claim 1 comprising:
   inserting one end of the T-bolt having the non-cylindrical shaped shank into the rail channel of an extruded rail; and
   inserting the other end of the T-bolt through the aperture of the clamp apparatus,
   wherein the aperture being consistent with the shape of the shank maintains the T-bolt in a locked position within the rail channel when positioned to secure at least two PV modules.

10. The method of claim 9, further comprising, orientating the clamp apparatus such that at least one alignment tab is positioned between the at least two PV modules.

11. The method of claim 9, further comprising rotating the T-into the rail channel, wherein the rotation facilitates engagement of the T-bolt into the rail channel.

12. The method of claim 11, wherein the act of rotating includes rotation in one of a clockwise or counter-clockwise direction.

13. The method of claim 9, further comprising threading a nut to the other end of the T-bolt, wherein the nut secures the clamp apparatus atop the at least two PV modules.

14. A PV module clamping system, comprising:
   at least two photovoltaic modules;
   a twist-lock bolt having a substantially rectangular-shaped head on one end and a non-cylindrical threaded shaft on the other end; and
   a clamp apparatus comprising:
      a body portion having an aperture defined therein with a shape consistent with the shape of the shaft; and
      a tab disposed at each longitudinal end of the body portion and extending initially outward in a same plane with the body portion and transitioning in a direction substantially perpendicular with the plane of the body portion,
   wherein when the clamp is installed, the tab extends between the at least two photovoltaic modules thereby prohibiting rotation of the t-bolt within a rail.

15. The PV module clamping system of claim 14, further comprising a locking nut that secures the clamp apparatus onto the twist-lock bolt.

16. The PV module clamping system of claim 14, wherein the substantially rectangular head has three square corners and one rounded corner, wherein the rounded corner facilitates rotation in a single direction.

17. The PV module clamping system of claim 14, wherein the aperture is a half-moon shape and wherein the shaft is a half-moon shape slightly smaller than the aperture.

18. The PV module clamping system of claim 14, wherein the aperture is a keyway shape slightly larger than the shaft configured in an appropriate mating keyway shape.

* * * * *